(12) United States Patent
Bruce et al.

(10) Patent No.: US 9,391,700 B1
(45) Date of Patent: Jul. 12, 2016

(54) INTEGRATED OPTICAL RECEIVER SKIN

(71) Applicant: Sunlight Photonics Inc., Edison, NJ (US)

(72) Inventors: Allan James Bruce, Scotch Plains, NJ (US); Michael Cyrus, Castle Road, CO (US); Sergey Frolov, Murray Hill, NJ (US)

(73) Assignee: Sunlight Photonics Inc., Edison, NJ (US)

( * ) Notice: Subject to any disclaimer, the term of this patent is extended or adjusted under 35 U.S.C. 154(b) by 0 days.

(21) Appl. No.: 14/740,706

(22) Filed: Jun. 16, 2015

(51) Int. Cl.
| | | |
|---|---|---|
| *G02B 6/10* | (2006.01) |
| *H04B 10/112* | (2013.01) |
| *G01J 1/42* | (2006.01) |
| *G01J 1/04* | (2006.01) |

(52) U.S. Cl.
CPC ............ *H04B 10/1121* (2013.01); *G01J 1/0422* (2013.01); *G01J 1/42* (2013.01)

(58) Field of Classification Search
CPC ............. G02B 6/10; G02B 6/26; H04B 10/12
USPC ............. 250/227.11, 227.24, 227.28; 385/15, 385/129, 131, 132; 398/141, 142, 214
See application file for complete search history.

(56) References Cited

U.S. PATENT DOCUMENTS

| | | | |
|---|---|---|---|
| 3,552,826 | A | 1/1971 | Hanes et al. |
| 3,706,485 | A | 12/1972 | Fawcett et al. |
| 3,799,653 | A | 3/1974 | Ikeda |
| 4,937,134 | A | 6/1990 | Schrenk et al. |
| 5,783,049 | A | 7/1998 | Bright et al. |
| 5,939,189 | A | 8/1999 | Phillips et al. |
| 6,366,013 | B1 | 4/2002 | Leenders et al. |
| 6,926,952 | B1 | 8/2005 | Weber et al. |
| 6,999,156 | B2 | 2/2006 | Chou et al. |
| 7,304,781 | B2 | 12/2007 | Chang-Hasnain et al. |

(Continued)

FOREIGN PATENT DOCUMENTS

| | | |
|---|---|---|
| EP | 0664893 | 8/1995 |
| EP | 0945254 | 9/1999 |

(Continued)

OTHER PUBLICATIONS

O'Brien et al., Advanced Receivers for Free-space Optical Communications, Proc. SPIE 5614, 129-138, 2004.

(Continued)

*Primary Examiner* — Kevin Pyo
(74) *Attorney, Agent, or Firm* — Stuart H. Mayer; Mayer & Williams PC

(57) ABSTRACT

A multilayer film or skin for free space optical data transmission includes a first outer layer. The first outer layer has a first laterally extending area that transmits optical data signals received over a range of incident angle. A second layer that includes a second laterally extending area underlies the first layer. At least a portion of the optical data signals received by the second layer from the first outer layer is focused or otherwise concentrated into a substantially reduced area. An optical detector receives the concentrated optical data signals from the second layer. An electrical connection extends from the optical detector to an external receiving device. The multilayer film or skin may be used, for example, in applications involving mobile free space optical communication platforms where low profile, volume and mass and/or enhanced platforms are important.

29 Claims, 3 Drawing Sheets

(56) References Cited

U.S. PATENT DOCUMENTS

| | | |
|---|---|---|
| 8,433,207 B2 | 4/2013 | Shin et al. |
| 8,977,084 B2 | 3/2015 | Hulsey |
| 2002/0186928 A1 | 12/2002 | Curtis |
| 2005/0117866 A1 | 6/2005 | Park et al. |
| 2010/0062217 A1 | 3/2010 | Kurematsu |
| 2010/0098430 A1* | 4/2010 | Chui .................. G02B 6/00 398/142 |
| 2010/0150511 A1 | 6/2010 | Arsenault et al. |
| 2010/0245978 A1 | 9/2010 | Baumberg et al. |
| 2012/0262789 A1 | 10/2012 | Xie et al. |
| 2013/0004711 A1 | 1/2013 | Doi et al. |
| 2013/0344290 A1 | 12/2013 | Yu et al. |

FOREIGN PATENT DOCUMENTS

| | | |
|---|---|---|
| WO | 99/36262 | 7/1999 |
| WO | 2010062217 | 6/2010 |
| WO | 2013083624 | 6/2013 |

OTHER PUBLICATIONS

Karp et al., Planar Micro-optic Solar Concentrator, Optics Express, 18, 1122-33, 2010.

Bouchard et al., Graded-index Planar Waveguide Solar Concentrator, Optics Lett., 39, 1197-1200, 2014.

C. Schlick, An inexpensive BRDF model for physically-based rendering, Computer Graphics Forum 13, 233, 1994.

Moghal et al., High performance, single-layer, anti-reflective optical coatings comprising mesa-porous silica nanoparticles, Appl. Mater. Interfaces, 4, 854-9, 2011.

Paivanranta et al., A wide-angle anti-reflection surface for the visible spectrum, Nanotechnology, 20, 375301, 2009.

Guldin et al., Self-cleaning antireflective optical coatings, Nano Lett., 13, 5329-35, 2013.

Fang et al., Nanoparticle stacks with graded indices Enhance the Omnidirectional Light Harvesting of Solar Cells and the Light Extraction of Light-Emitting Diodes, Adv. Functional Mat., 23, 1412-21, 2013.

Perl et al., Ultra broadband and wide-angle hybrid antireflection coatings with nanostructures, J. Photovoltaics, 4, 962-7, 2014.

Orlovskiy et al., Broadband dielectric mirrors, for optical diagnostics in ITER, Fusion Energy and Design, 88, 1284-7, 2013.

Karagodsky et al., Theoretical analysis of sub-wavelength high contrast grating reflectors, Optics Express, 18, 16973-82, 2010.

Hao et al., Broadband compact reflector based on all-dielectric sub-wavelength nanoparticle chains, Optical Engineering, 52, 068001, 2013.

Ricciardi et al., Broadband mirrors in the near-infrared based on sub-wavelength gratings in SOI, IEEE Photonics Journal, 2, 696-702, 2010.

Haley Birch, How to disappear completely, Chemistry World, 42-45, Jun. 2010.

Griggs et al., Dynamic optical tags, Proc. SPIE 5441, 151-60, 2004.

Sumriddetchkajorn et al., High-dynamic-range, high-optical-isolation, wavelength-sensitive, thin film filter-based, variable fiber optic attenuator, Optical Engineering 45, 035004, 2006.

Li et al., "Broadband compact reflector based on all-dieletric subwavelength nanoparticle chains: reflecting lights beyond normal incidence with a very high reflectivity" SPIE Optical Engineering, 12 pages, Aug. 8, 2014.

Perl, "Ultrabroadband and Wide-Angle Hybrid Antirefelction Coatings With Nanostructures" IEEE Journal of Photovoltaics, vol. 3, No. 3, May 2014, 962-967.

Y. Li & C. Henry, Silicon Optical Bench Waveguide Technology, Optical Fiber Telecomm.IIIB, 319-76, Kaminow & Koch, Academic Press 1997.

Garlington et al., Analysis of Free Space Optics as a Transmission Technology, US Army Information Systems Engineering Command, WP AMSEL-IE-TS-05001, Mar. 2005.

Carrasco-Casado et al., Free Space Laser Communications with UAVs, NATO-OTAN, RTO-MP-IST-099, P7, 2009.

Henniger et al., An Introduction to Free Space Optical Communications, Radio Engineering, 19, 203-212, 2010.

Horwath et al., Broadband Backhaul Communication for Stratospheric Platforms, Proc. SPIE 6304, 2006.

Price et al., Wide-angle Planar Micro-tracking for Quasi-Static Microcell Concentrating Photovoltaics, Nature Comm., DOI 10.1038/ncomms7223, 2015.

Nanfang Yu, IEEE Journal of Selected Topics in Quantum Electronics, vol. 19, No. 3, May/Jun. 2013 Flat Optics: Controlling Wavefronts With Optical Antenna Metasurfaces.

\* cited by examiner

INTEGRATED OPTICAL RECEIVER SKIN

FIELD OF INVENTION

The present invention relates to the structure and functionality of an integrated planar optical receiver device with enhanced optical signal collection which incorporates a multi-functional, multi-layer, film, or skin. One field of use includes free space optical (FSO) communications antenna.

BACKGROUND

Multi-functional articles, in which multiple structural and/or functional materials, or components, are integrated to achieve advantages of reduced volume, weight, cost, power consumption, and/or enhanced performance, reliability and more, are of great technological interest in many fields.

The field of FSO communications has high potential and presents significant challenges. Modern FSO communication systems for the transmission of data through atmosphere, or space, with the use of a modulated light beam, typically in the visible or near-infrared (NIR) region of the electromagnetic spectrum. Such systems have the potential to support high capacity data transmission, and do not require a physical backbone such as an optical fiber. FSO links may be rapidly and inexpensively deployed and can circumvent many licensing or right-of-way restrictions. Additionally, since FSO communications links operate in lower refractive index media they can also support higher transmission speed than fiber optics.

FSO communications systems typically consist of a transmitter, e.g. a laser, or Light Emitting Diode (LED), which emits a light beam which is modulated to encode it with data. The resulting optical data signal is transmitted through atmosphere or space, to a remote receiver, which can incorporate light collection optics and a semi-conductor photo detector connected to an analyzer.

Technological challenges for FSO communications include: (i) signal attenuation due to atmospheric absorption or scattering. This is less of an issue at higher altitudes and insignificant in space or vacuum; (ii) beam divergence, without a confining medium such as provided in an optical fiber. The use of collimated laser beams can mitigate this issue, but there can still be significant divergence which reduces the signal power density with distance; (iii) scintillation due to atmospheric fluctuations of temperature and density, which effects signal integrity and may ultimately limit data transmission rate. This is less of an issue at high altitudes and space, or vacuum, and may be mitigated by the use of phased array detection in conjunction with computational analysis; and (iv) precision alignment (pointing) requirements of the sources and detectors to maintain FSO links. Alignment is more challenging if the transmitter or receiver, or both, are located on mobile platforms, in which case continual re-alignment, or "active pointing", may be required, which can employ GPS and secondary optical beams for initial coarse alignment.

In addition to the aforementioned challenges, available optical hardware can also be limiting for many FSO applications, especially for lightweight mobile platforms, such as Unmanned Aerial Vehicles (UAV), Satellites or Space vehicles. Optical receiver hardware is particularly challenging and typically requires a relatively large area for signal collection. FSO receivers often have the form of optical telescopes comprised of bulk optics for collecting and focusing incoming light onto small semi-conductor photo detectors. The telescopes can be mounted on gimbals for active pointing. This technology is bulky and impractical for thin planar implementations, which are desirable for lightweight mobile platforms.

Integrated receiver arrays on planar ceramic substrates were reported in the OPTOWIRE project, funded by the European Union (EU), for short link indoor FSO applications. This receiver incorporated overlying bulk focusing optics and was therefore not an integrated planar solution, although it did illustrate advantages of an array solution. "Reflect-array" receivers are also available, in which an array of reflectors or mirrors focus incoming light on a facing optical detector elevated above the plane. Both of the above examples illustrate that the construction of a FSO receiver device typically requires a significant optical path length, or thickness, to implement adequate concentrating or focusing functions. Applications in which it is desirable to implement thin, low profile, or planar, solutions generally cannot be addressed by these technologies.

Also known are planar structures for anti-reflective and concentrating optics. For example molded lens arrays and holographic structures are considered for concentrator photovoltaic modules. Such implementations do not specifically address FSO communication applications where high signal definition and high data rates are required. Moreover, planar waveguides have been fabricated in various transparent substrates including transparent polymers. One-dimensional (1D) waveguides with layered planar films with reflecting interfaces can trap incoming light and channel it via multiple-reflections to the edges of the device. Alternatively, two-dimensional (2D) waveguides may be defined by physical, or refractive index methods to provide enhanced confinement or signal selectivity. 2D waveguides require a higher degree of fabrication and more precise beam coupling. Silicon-optical-bench (SiOB) is an exemplary 2D planar waveguide technology which employs low-loss silica-based waveguides on a silicon substrate. SiOB technology can support many pertinent functions for optical communications including optical filtering, de-multiplexing and amplification. SiOB also provides a platform for the hybrid integration of semi-conductor devices with electrical and thermal interfacing.

SUMMARY

In accordance with a first aspect, the present disclosure describes an integrated planar optical receiver device which includes a multi-functional, multi-layered skin which incorporates at least (i) an anti-reflection surface layer and (ii) one, or more, light concentrating, and/or light-guiding, layer(s), which facilitate(s) the collection, concentration and guiding of light from a specifically defined surface area to (a) detection device(s), which is (are) integrated in, or on, the skin. The skin enables light collection over a large surface area and its subsequent routing to a relatively small active area on the detection devices(s). The skin may be deployed as a stand-alone element or as a covering on a platform, or structure, including mobile FSO communications platforms. Such integrated planar receiver devices will provide multiple benefits including reduced volume, area, weight, cost, enhanced performance and/or reliability.

In accordance with a second aspect, an integrated optical receiver device is described which is a wide-area and wide-angle optical receiver device functioning within standard optical communication wavelengths in the visible and/or NIR range.

In accordance with a third aspect, an integrated optical receiver device is described which does not require "active pointing" independent from the supporting platform, but nonetheless exhibits sufficient harvesting of transmitted signals.

In accordance with a fourth aspect, beam steering or light turning elements are employed to convert perpendicularly coupled light to an in-plane directionality in the waveguiding layer(s) for the purpose of implementing a thin or low-profile optical receiver device.

In accordance with a fifth aspect, an integrated optical receiver device is described in which multiple optical collection areas are separately defined on the skin and may be configured into an array. Each collection area may transmit light to single, or multiple, detector device(s).

In accordance with a sixth aspect, the surface collection areas are defined by implementing (i) optical lens elements, or gratings, in the upper and/or concentrating layers or (ii) establishing non transmitting boundaries in the upper and/or concentrating layers or (iii) by other means.

In accordance with a seventh aspect, the device is planar, thin, lightweight and/or flexible.

In accordance with an eighth aspect, the device can concentrate incident light by a factor of at least 10 but preferably 1000, or more.

Embodiments of the present invention, summarized above and discussed in greater detail below, can be understood by reference to the illustrative embodiments of the invention depicted in the appended drawings. It is to be noted, however, that the appended drawings illustrate only some embodiments of the invention and are therefore not to be considered limiting of its scope, for the invention may admit to other equally effective embodiments.

DETAILED DESCRIPTION

Figure 1A:
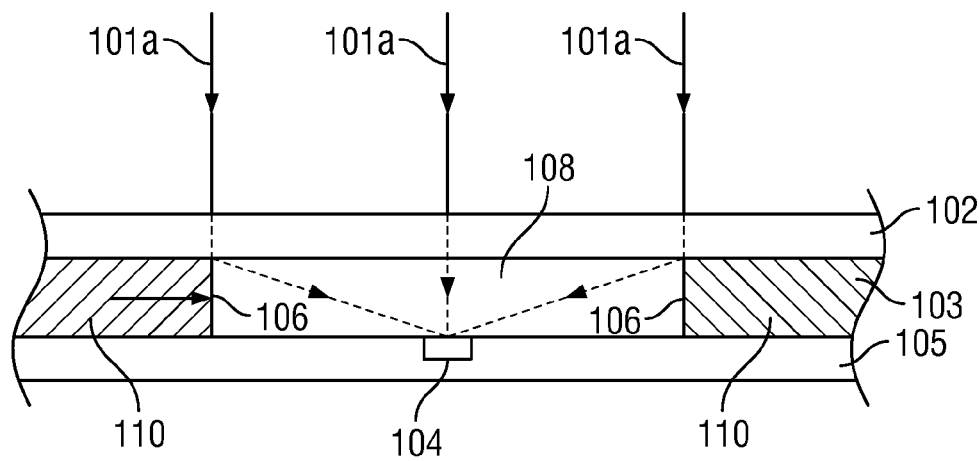
FIGS. 1A and 1B show cross-sections of one example of a multi functional, multi-layered optical receiver skin that can receive normally incident light (FIG. 1A) or angularly incident light (FIG. 1B).

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

The present disclosure describes a multi-functional, multi-layered article which is a film a skin, which can be deployed as a stand-alone component or as a covering for a frame or structure. The film, or skin, having integrated structural and functional, or multi-functional, roles. The film, or skin, can include a single, or multiple layers, each, or all, of which may be structurally or compositionally homogeneous, or composite, in nature. Specific functionality may be located in a single layer or distributed in a number of layers. Multiple functionalities may be located in the same layer, different layers, or have some layers in common. The functionality may be located in the same or distinct areas of the skin.

As used herein, the term "layer" is used to refer to each of the one or more compositions, or structures, the same or different, that are secured to one another in thin sheet or film-form by any appropriate means such as by an inherent tendency of the materials to adhere to one another, or by inducing the compositions to adhere as by a heating, radiative, chemical, or some other appropriate process. The term "layer" is not limited to detectable, discrete compositions contacting one another such that a distinct boundary exists between the compositions. Preferably however, one or more of the components used to make one layer of a film will be different (i.e., the weight percent of components, the structure or the properties of each component, and/or the identity of the components may differ) from the composition used to make an adjacent layer, when present. The term "layer" includes a finished product having a continuum of compositions throughout its thickness. The "films" or "skins" described herein comprise one or more layers, and may comprise two, three or more layers that are secured to one another to form a single identifiable structure.

The layers of the film or skin may be joined in several ways which include; fusing of similar, or dissimilar, but separate, materials layers (e.g. by thermal lamination), or by using adhesives. The skin may also be formed by the sequential deposition and/or structuring of material layers in a monolithic form. One such sequential deposition method that may be employed is 3D printing. Various patterning and etching processes may be also be employed Established technologies may be employed for the fabrication and integration of light collection, light guiding and receiver elements in a multi-functional skin. For instance, the functional elements may be fabricated separately as planar elements on flexible substrates and then laminated or, they may be fabricated directly on a common substrate. The functional elements may be located in specific layers of the skin or they may be wholly or partially co-located in common layers.

The present disclosure describes a multi-functional, multi-layer film or skin which in some embodiments includes an optical transmitting layer, a waveguiding layer which receives optical data signals incident on the optical transmitting layer, an integrated optical detector and a mechanism for coupling the light between (i) the transmitting and waveguiding layers and (ii) the waveguiding layer and the optical detector. The use of elements with planar structures is desirable and can facilitate the realization of a fully integrated planar receiver device in which the device thickness is much less than its optical path.

In one aspect, the skin is designed to achieve advantages of integration which may include reduced thickness, size, area, weight, power consumption, cost, enhanced performance and/or enhanced reliability. While the skin has broad applicability, it will be especially useful for applications involving mobile FSO communication platforms and, more specifically, for a skin, or covering of a UAV communications platform. There is significant interest in such platforms to enable a variety of communication applications in areas of civil and defense aviation.

Figure 1B:
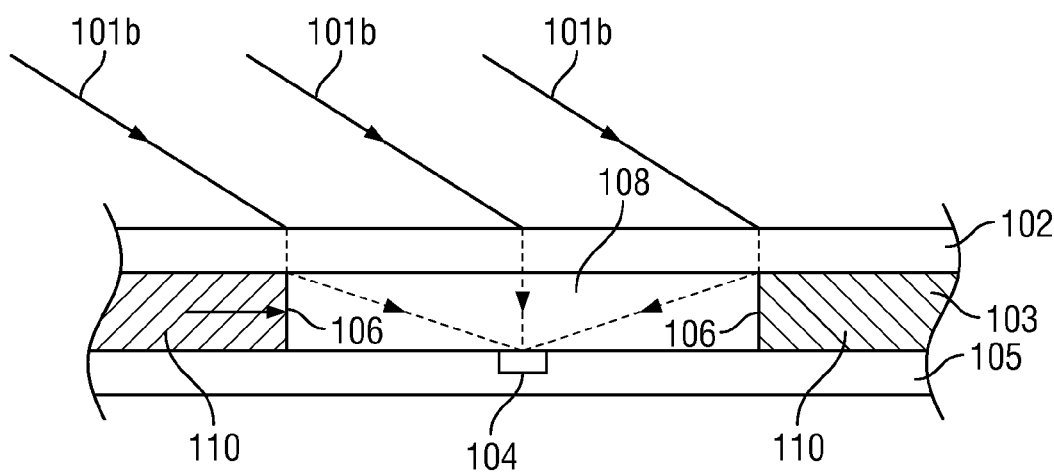

FIGS. 1A and 1B show an exemplary cross-section of a multi-functional, multi-layered optical receiver skin. It is shown as a multilayer article receiving incoming normal (101a), or angular (101b) light beams (101) (e.g., optical data signals) which are transmitted through an outer wide angle AR layer (102) to a concentrating layer (103) where it is focused and transmitted to a coupling area of a waveguide (not shown in FIGS. 1A and 1B), which is located on a substrate that also includes an optical detector (104) (e.g., a photo detector). The waveguide transmits the received light beams to the optical detector 104. The substrate, and hence the optical detector 104, are located on, or embedded in, a lower layer (105). The substrate may serve as a structural support for the waveguide and optical detector 104 and it may incorporate electrical and other inputs and outputs necessary for the functioning of a receiver device to which the optical detector 104 provides the detected signal.

In some embodiments the concentrating layer 103 concentrates the optical data signal by at least a factor of 10 at the optical detector 104. In other embodiments the concentrating layer 103 concentrates the optical data signal by at least a factor of 100 at the optical detector 104. In this context concentration refers to the net value provided to optical detector 104 by the concentrating layer 103 and any other layers that may be intervening between the concentrating layer 103 and the optical detector 104.

In some embodiments the incident light that is collected by the concentrating layer 103 and transmitted to the detector 104 may be restricted to a finite, laterally extending region of the concentrating layer 103 whose boundaries are schematically represented in FIGS. 1A and 1B by dashed vertical lines 106 that are shown extending through a cross-section of the concentrating layer 103. That is, in this embodiment light that traverses laterally extended region 108 (which is shown without hatching in FIGS. 1A and 1B) of concentrating layer 103 may be focused onto the optical detector 104, whereas light that traverses concentrating layer 103 outside of the region 108 will not be focused onto the detector 104. In FIGS. 1A and 1B the regions of concentrating layer 103 that do not transmit light to detector 104 are illustrated as hatched regions 110. The boundaries 106 between the different regions 108 and 110 of the concentrating layer 103 may be physically defined in any of variety of different ways. For example, a non-transmitting perimeter may be fabricated, for instance, by a localized structural or compositional modification of one or more of the layers. Alternatively, or in addition thereto, one or more optical elements such as integrated lenses or gratings may incorporated within the skin. In some particular embodiments these optical elements may be located within the concentrating layer 103, although this need not always be the case. By confining the light that can reach the optical detector 104 to some specified laterally extending region (e.g., region 108), potentially deleterious signal effects that can impair communication of the optical data signals because of things such as time delays and interference can be reduced or eliminated. Moreover, the use of such a confinement region may also facilitate the implementation of phased array detection.

Figure 2:
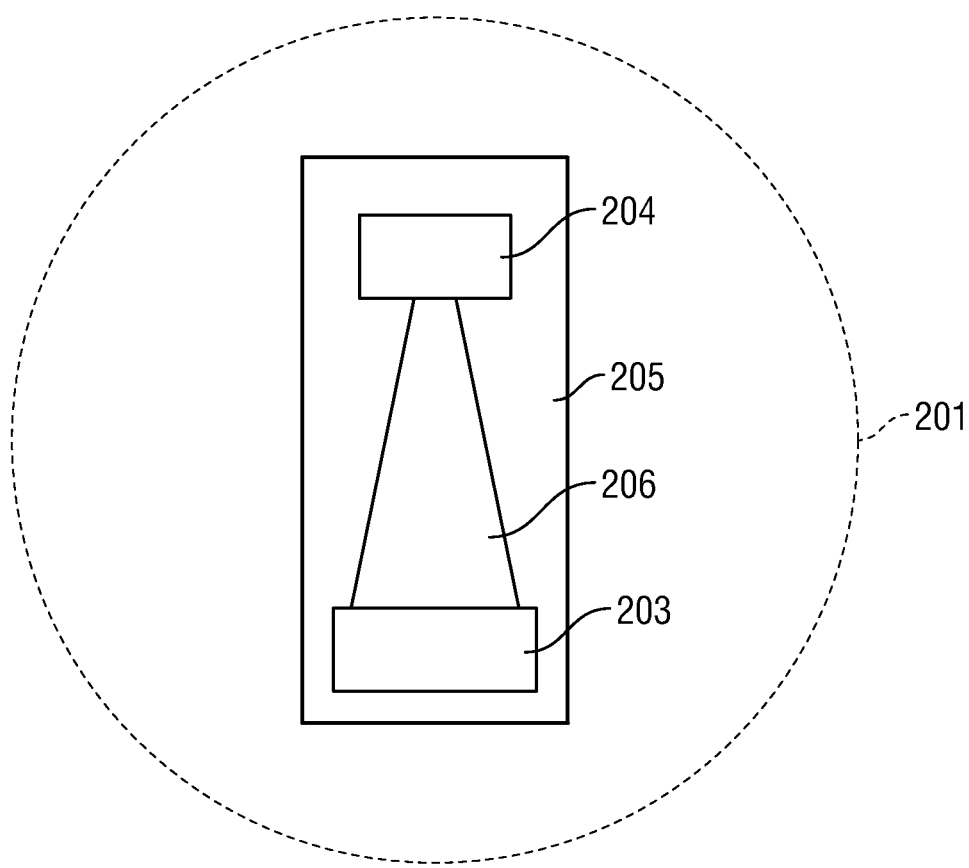
FIG. 2 shows a top view of the multi-functional, multi-layered optical receiver skin of FIGS. 1A and 1B incorporating an anti-reflection (AR) layer, a concentrating layer and a detector layer.

FIG. 2 shows an exemplary top view of a portion of the multi-functional, multi-layered optical receiver skin shown in FIGS. 1A and 1B. The figure shows a defined optical confinement region (201) (corresponding to region 108 of concentrating layer 103 in FIGS. 1A and 1B) that focuses light onto the optical detector 204. In this example the optical detector 204 is located on a substrate 205. The substrate 205 also accommodates a waveguide 206 (e.g., a tapered waveguide) for coupling the light received by the coupling region 203 to the optical detector 204, which in turn can communicate the received optical signal to processing electronics that may be located elsewhere on the skin or at a remote location that is not on or otherwise integrated with the skin. The processing electronics may be used to extract the data embodied in the optical data signals in a well-known manner.

Figure 3:
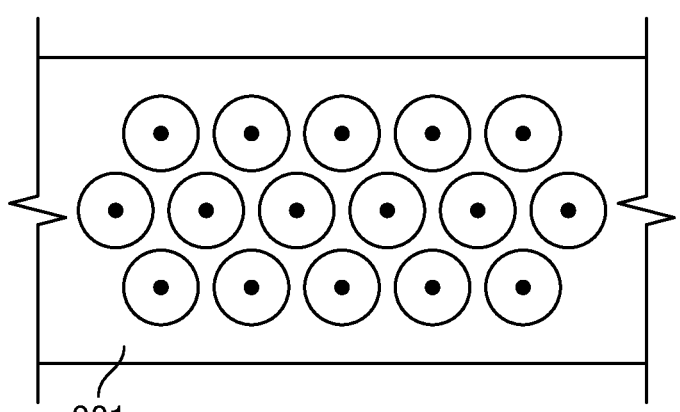
FIG. 3 shows a top view of another example of a multi-functional, multi-layered optical receiver skin showing an array of optical detectors.

FIG. 3 shows an exemplary top view of the multi-functional, multi-layered optical receiver skin shown in FIGS. 1A and 1B, which includes multiple optical detectors (301) (corresponding to optical detector 204 shown in FIG. 2) arranged in an array. Each optical detector 301 may be located on its own substrate and, as in FIG. 2, may be integrated with a waveguide, optical coupling region and any associated processing electronics. The array optionally may be configured for use as a Phased Array for improved signal detection. Multiple arrays of optical detectors may be employed for the same skin, or for different skins located on different regions of a platform or structure. With appropriate configuration and the use of computational analysis, such detector arrays can be used to enhance signal definition, detection and data transmission rate. The use of concentrator "micro-arrays" and receiver "macro-arrays" may provide additional enhancement.

Figure 4:
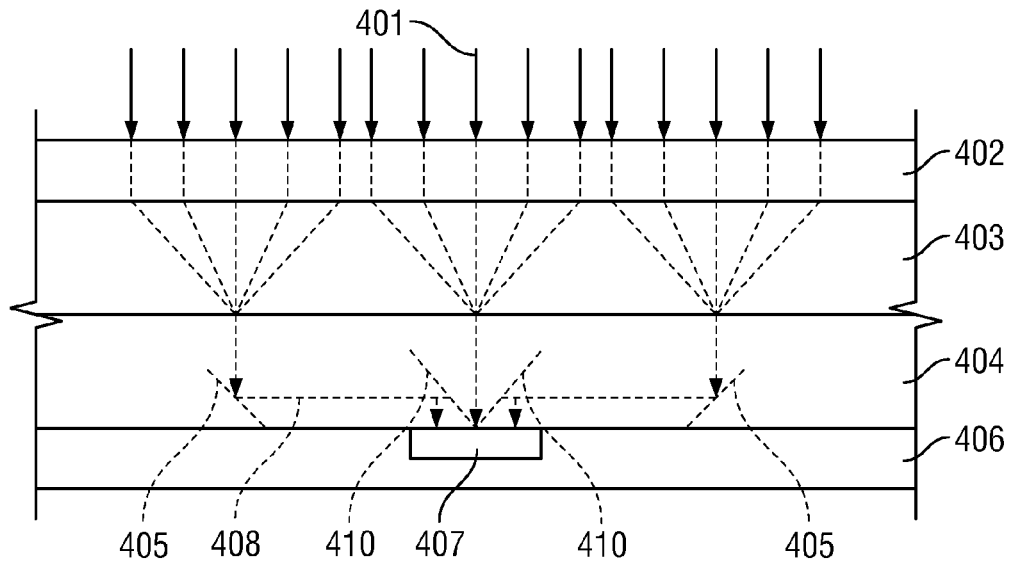
FIG. 4 shows a cross sectional view of another example of a multi-functional, multi-layered optical receiver skin incorporating an anti-reflection (AR) layer, a concentrating layer, a waveguiding layer and a detector layer.

FIG. 4 shows an exemplary cross-section of a multi functional, multi-layered optical receiver skin with distinct concentrating and light guiding layers. These concentrating and guiding layers may be comprised of multiple sub-elements to facilitate enhanced concentration of the incoming light. The skin in FIG. 4 is shown as a multilayer article receiving an incoming optical data signal (401) which is transmitted through an outer wide angle AR layer (402) to a concentrating layer (403) where it is focused and transmitted by an array of concentrating elements (e.g., one or more lenses) to a waveguiding layer (404), which incorporates beam steering elements (405), such as turning mirrors or the like, to launch the concentrated beams into one or more waveguides 408 that are formed in the waveguiding layer 404. The waveguide(s) 408, in turn, couple the optical data signal to an optical detector (407) (e.g., a photodetector). As shown, the optical detector 407 is integrated in a lower layer (406). Additional beam steering elements 410 may be provided to direct the light from the waveguide(s) 408 onto the active surface of the optical detector 407. Alternatively, the optical detector 407 may be located within the waveguiding layer 404 itself, in which case the optical detector 407 may receive the optical data signals directly from the waveguide(s) 408, thereby eliminating the need for the beam steering elements 410.

Figure 5:
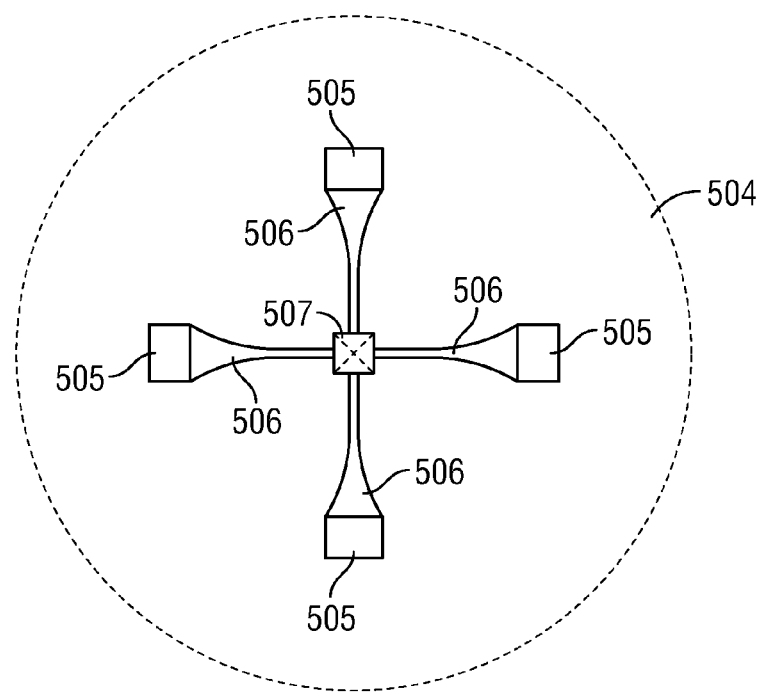
FIG. 5, shows a top view of the waveguiding layer in FIG. 4, which illustrates multiple beam steering elements and 2D waveguides.

FIG. 5 shows an exemplary top view of a waveguiding layer (504) as described in FIG. 4. Multiple (e.g. 4) beam steering elements (505) are defined to launch the focused output from the concentrating layer 403 of FIG. 4 into waveguides (506), which transmit the light to an additional beam steering element(s) (not shown in FIG. 5) for coupling into the optical detector 507 located in the lower layer 406 of FIG. 4.

In some embodiments the use of a wide-angle light collection surface in the multi-functional, multi-layered film or skin can advantageously reduce the required precision or active pointing of the optical detector towards the transmitter. Of course, even though the required precision may be reduced, the skin surface will nevertheless still need to be oriented in the general direction of the transmitter.

In some embodiments, integrated optical receiver skins can be deployed on different surface areas of the same, or multiple, mobile platform(s) to facilitate the receipt of optical signals from various directions. For instance on an aircraft or UAV platform, the receiver skins may be located on the top or bottom of the wings or on the tail or other areas of the fuselage for multiple directional communications. Multiple skins may be used independently, or in conjunction, to access better receiver performance. These skins may also be deployed on multiple platforms operating in a coordinated fashion.

In some embodiments a multi-functional, multi-layered film or skin may be employed which is substantially comprised of layers of fluorinated polymer materials, such as ETFE or PVDF, which are light-weight, flexible and have excellent optical transmission and other desirable properties. Such polymers have been used previously for the fabrication of AR coatings and may be similarly employed for the present invention. Examples of suitable AR coatings that may be used in some embodiments are shown in U.S. patent application Ser. No. 14/466,935 entitled "Flexible and Tunable Anti-Reflection Skin," which is hereby incorporated by reference in its entirety. Such anti-reflection coating may include, for example, index profiled AR coating, interference-based AR coatings, nano-structured, or nano-particulate AR coatings, composite AR coatings, and combinations thereof.

In some embodiments similar fluorinated polymeric materials may be used for the concentrating and waveguide layers by appropriate compositional or structural modifications. Exemplary compositional modifications include the substitution of Deuterium for Hydrogen to adjust the refractive index and absorption characteristics of the polymer material. Exemplary structural modifications include molding (e.g. of lens elements), or nano-structuring.

In some embodiments, selective etching in combination with metallic, or other coatings, can be used to implement beam steering elements such as turning mirrors.

In some embodiments integrated semi-conductor optical receivers (e.g., optical detector 204 shown in FIG. 2, along with any optical elements integrated therewith) may be located on Silicon Optical Bench (SiOB) platforms. Such platforms have the benefit of enabling the fabrication of low-loss waveguides, which are particularly desirable for devices which may include long waveguides. SiOB technology also enables the integration of additional optical functional elements including those performing functions such as filtering, signal delay, demultiplexing, amplification and so on. SiOB platforms are typically a few square centimeters in area and may be integrated in, or on a layer in the planar optical receiver device.

What is claimed is:

1. A multilayer film or skin for free space optical data transmission, comprising:
   a first outer layer, which includes a first laterally extending area that transmits optical data signals received over a range of incident angles; and
      a second layer that includes a second laterally extending area which underlies the first layer in which at least a portion of the optical data signals received from the first outer layer is concentrated into a substantially reduced area, wherein the second layer only accepts optical data signals from a specific optical collection area that is defined in the second layer, the specific optical collection area being less than an entirety of the second layer; and
   an optical detector for receiving the concentrated optical data signals from the second layer; and
   an electrical connection extending from the optical detector to an external receiving device.

2. The multilayer film or skin of claim 1, wherein the first outer layer is planar, conformal and/or structured with micro- or nano-structures.

3. The multilayer film or skin of claim 1, wherein the first outer layer includes a wide angle AR surface layer.

4. The multilayer film or skin of claim 1 wherein the specific optical collection area is defined by one or more structural components located in the film or skin.

5. The multilayer film or skin of claim 4 wherein the structural components include micro- or nano-structures.

6. The multilayer film or skin of claim 4 wherein the structural components include molded or graded index optical elements and/or gratings located in the first and/or second layers.

7. The multilayer film or skin of claim 1, wherein the multilayer film or skin further comprises a third layer which accepts the optical data signals from the second layer, the third layer including at least one waveguide for directing the optical data signals to the optical detector.

8. The multilayer film or skin of claim 7, wherein the at least one waveguide has dimensions that cause optical interference or other signal degrading effects to be reduced.

9. The multilayer film or skin of claim 7, wherein, the at least one waveguide is defined by physical etching, molding and/or compositional profile adjustments.

10. The multilayer film or skin of claim 1 further comprising a planar substrate on which the optical detector is integrated.

11. The multilayer film or skin of claim 10 further comprising one or more light steering elements and/or optical waveguides that are integrated on the planer substrate.

12. The multilayer film or skin of claim 10 further comprising a lower layer located below the second layer, the planar substrate being located on or in the lower layer.

13. The multilayer film or skin of claim 7, wherein the third layer comprises one or more discrete planar substrate(s) having integrated optical elements thereon which is embedded within supporting or encapsulating materials.

14. The multilayer film or skin of claim 1, wherein the multi-layer film or skin further comprises an additional layer that includes one or more electrical circuits or backplanes to enable interconnection of the optical detector to the external receiving device.

15. The multilayer film or skin of claim 7 wherein the optical detector comprises a plurality of optical detectors.

16. The multilayer film or skin of claim 7 wherein the plurality of optical detectors is configured as an array for enhancing optical signal detection and/or differentiation.

17. The multilayer film or skin of claim 15, wherein the at least one waveguide comprises a plurality of waveguides each directing optical data signals to a different one of the optical detectors.

18. The multilayer film or skin of claim 17, further comprising a plurality of different laterally extending collection areas located on the surface of the film, each of the different laterally extending collection areas directing optical data signals to corresponding elements in the concentrating layer, the corresponding elements each directing optical data signals to one of the waveguides.

19. The multilayer film or skin of claim 17, wherein the waveguides have lengths tailored to provide specific path length or a time delay, for the optical data signals prior to reaching the optical detectors in order to reduce interference or other signal degrading effects.

20. The multilayer film or skin of claim 1, wherein the second layer concentrates the optical data signal by at least a factor of 10 at the optical detector.

21. The multilayer film or skin of claim 1, wherein the second layer concentrates the optical data signal by at least a factor of 100 at the optical detector.

22. The multilayer film or skin of claim 1, wherein the multi-layer film or skin is flexible.

23. The multilayer film or skin of claim 1 further comprising a self-supporting frame on which the multilayer film or skin is deployed.

24. The multilayer film or skin of claim 1 wherein the multilayer film or skin is a free-standing, self-supporting structure.

25. The multilayer film or skin of claim 7 wherein the multi-layer film or skin is a planar device in which the first, second and third layers are physically joined or stacked.

26. An apparatus, comprising:
   a mobile platform;
   at least one multilayer film or skin for free space optical data transmission located on the mobile platform, the multilayer film or skin including:
      a first outer layer, which includes a first laterally extending area that transmits optical data signals received over a range of incident angles;
      a second layer that includes a second laterally extending area which underlies the first layer in which at least a portion of the optical data signals received from the first outer layer is concentrated into a substantially reduced area, wherein the second layer only accepts optical data signals from a specific optical collection area that is defined in the second layer, the specific optical collection area being less than an entirety of the second layer;
      an optical detector for receiving the concentrated optical data signal from the second layer; and
      an electrical connection extending from the optical detector to an external receiving device.

27. The apparatus of claim 26 wherein the at least one multilayer film or skin includes a plurality of multilayer films or skins located on different portions of the mobile platform.

28. The apparatus of claim 27 wherein at least two of the multilayer films or skins are configured to provide at least some optical wavelengths to the optical detectors respectively included therewith that differ from one another.

29. The apparatus of claim 26 wherein the mobile platform includes an Unmanned Aerial Vehicles (UAV).

* * * * *